April 13, 1926.
L. T. LARSEN
1,580,502
MECHANISM FOR AUTOMATIC TURNING OF IRRIGATING PIPES
Filed March 26, 1923
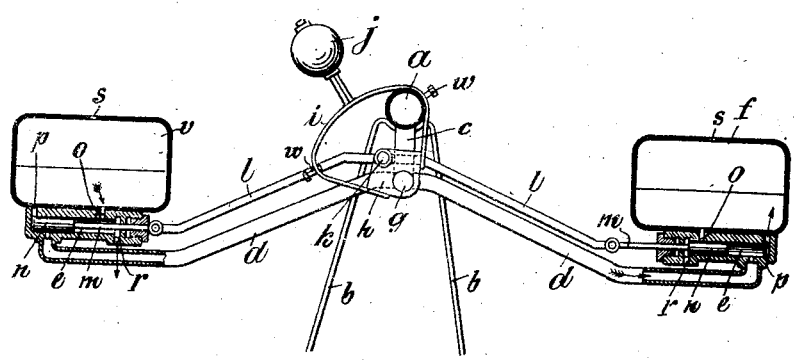
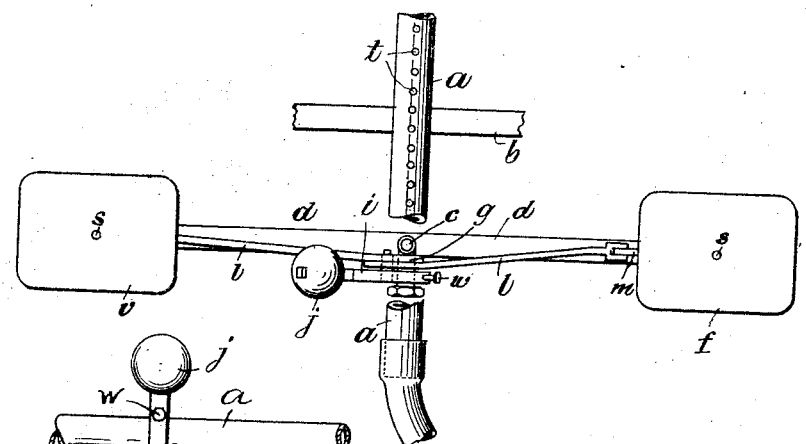
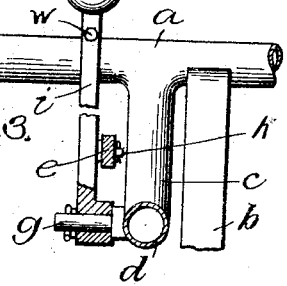
L. T. Larsen, Inventor Patented Apr. 13, 1926.

1,580,502

UNITED STATES PATENT OFFICE.

LAURITS THORVALD LARSEN, OF LUMBY MARK, DENMARK.

MECHANISM FOR AUTOMATIC TURNING OF IRRIGATING PIPES.

Application filed March 26, 1923. Serial No. 627,904.

*To all whom it may concern:*

Be it known that I, LAURITS THORVALD LARSEN, a subject of the King of Denmark, residing at Lumby Mark, county of Odense, and Kingdom of Denmark, have invented certain new and useful Improvements in Mechanisms for Automatic Turning of Irrigating Pipes, of which the following is a specification.

In horticulture it is common to use for artificial watering or sprinkling a long pipe in which a row of small discharge holes are drilled for the water supplied under pressure. The pipe is supported on horses and is continuously turned about its longitudinal axis so as to enable it to sprinkle alternately to the right and to the left.

The present invention relates now to a mechanism adapted to reverse such water pipe automatically at predetermined time intervals.

One construction of the invention is shown on the drawing.

Fig. 1 is an end view of the device, partly in section.

Fig. 2 shows the same in top view.

Fig. 3 is a side view partly in section, of certain details.

$a$ is a watering pipe resting on horses $b$ and fitted with discharge holes $t$, to which the pressure water is directed by way of a hose.

On the pipe $a$ there is rigidly connected a short downwardly directed branch pipe $c$ rigidly connected to the centre of a pipe $d$, the ends of which carry vessels $f$ and $v$, each with an air hole $s$ and two ports $o$ and $p$ leading to slide valve boxes $e$, in which slide valves $n$ may travel. These valves have guide rods $m$ connected by links $l$ which are pivoted at $k$ to a quadrant $h$. The latter is pivotally mounted on a lug $g$ provided at the pipe joint between the pipes $c$ and $d$, and the quadrant supports a bent bar $i$ with a weight $j$. This bent bar $i$ encircles the watering pipe $a$ and is fitted, on either side, with a tappet screw $w$, by means of which the rotation of the pipe $a$ may be limited.

The apparatus acts in the following manner:

Supposing the apparatus to be in the position in which the vessel $v$ is swung downward, then the jet holes $t$ will be turned towards the left. The bent bar $i$ will occupy the position shown in Fig. 1, and the slide valve $n$ of the vessel $v$ will occupy its extreme position to the left, in which position it prevents communication between the pipe $d$ and the port $p$ in the vessel $v$, and opens the connection between the other port $o$ of the said vessel and a discharge hole $r$ in the valve box.

In the vessel $f$ the slide valve $n$ is also in the left hand extreme position, but thereby the discharge opening $o$ becomes closed, and the connection between the pipe $d$ and the port $p$ is opened, so that this vessel is slowly filled with water from the pipe $a$ by way of the pipes $c$ and $d$.

In Fig. 1 it is assumed that the perforations $t$ have been spraying toward the left and that the fluid in the vessel $v$ is about halfway discharged while the vessel $f$ is about half filled. It may be seen that as the vessel $f$ continues to fill it will move in a clockwise direction while the vessel $v$ will move up. As the pipe $d$ is rigidly connected to the pipe $c$, it is obvious that as the vessels move in a clockwise direction, the pipe $c$ will also move in a clockwise direction and that the quadrant $h$ will be moving in an arc about the axis of the pipe $a$. Consequently the weight $j$ will be moved nearer to the vertical line passing through $a$ and eventually the weight $j$ will drop over on the right hand side of the pipe $a$ and this will cause shifting of the valves $n$, so that the operation will be reversed.

The weight $j$ ensures the shifting of the valves to be performed suddenly.

Having now particularly described my invention, what I claim is:—

1. In combination, a perforated water pipe mounted for oscillation, a feed pipe fixed to and depending from the perforated pipe, a cross pipe having its intermediate portion rigidly connected to the depending pipe, a pivot pin fixed to one of the two last mentioned pipes and spaced from the perforated pipe, a balance vessel arranged at each end of the cross pipe and adapted to receive liquid from the latter, a valve for controlling the admission of fluid to and the discharge of fluid from each of said vessels, a member mounted on said pivot pin, rods pivotally connecting said member to said valves, and a counterweight connected to said member for causing actuation of the valves, the one to open and the other to closed position, after one or the other of said vessels has tipped a predetermined amount.

2. An apparatus for automatically oscillating watering pipes including two vessels arranged at opposite sides of the watering pipe, a cross-pipe connecting the vessels rigidly to the watering pipe, valves for controlling the feeding of the water from the cross pipe into and out of said vessels, connecting rods pivotally connecting said valves, a quadrant pivotally connected to said rods, and counterweight means connected to the quadrant for actuating the latter.

3. An apparatus for automatically oscillating watering pipes including two vessels arranged at opposite sides of the watering pipe, a cross-pipe connecting the vessels rigidly to the watering pipe, valves for controlling the feeding of the water from the cross pipe into and out of said vessels, a pivotally mounted quadrant, rods pivotally connected to said quadrant and to said valves, and means for automatically swinging said quadrant after one or the other vessels has tipped a predetermined distance.

4. In combination, supporting means, a perforated pipe oscillatable on the supporting means, a feed pipe rigidly connected to the perforated pipe to receive water from the latter, a cross pipe rigidly connected to the feed pipe and receiving water from the latter, a vessel arranged at each of the ends of the cross pipe and adapted to receive liquid from the latter, a discharge port for each vessel, a valve for controlling the passage of water from the cross pipe into the vessel and from the vessel through the discharge port, a member pivotally mounted on said pipes and arranged about midway between the ends of the cross pipe, rods and links pivotally connecting said member to the valves to cause one valve to open and the other to close when one or the other of said vessels tips a predetermined amount, and means for automatically swinging said member when one or the other vessel tips a predetermined amount.

5. A combination as claimed in claim 4 in which the last mentioned means includes a counterweight connected to said member.

6. A combination as claimed in claim 4 in which the last mentioned means includes a strap connected to the member, adjustable stops arranged at opposite points on the strap and adapted to limit the swinging movement of said member, and a counterweight connected to said strap.

LAURITS THORVALD LARSEN.